United States Patent
Ma et al.

(10) Patent No.: US 11,567,643 B2
(45) Date of Patent: Jan. 31, 2023

(54) SYSTEMS AND METHODS FOR INTERACTING WITH A DIGITAL MAP

(71) Applicant: Ford Global Technologies, LLC, Dearborn, MI (US)

(72) Inventors: Jiaqi Ma, Novi, MI (US); Robert Collard, Hazel Park, MI (US); David Melcher, Ypsilanti, MI (US); Jason Snow, Ferndale, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 17/159,035

(22) Filed: Jan. 26, 2021

(65) Prior Publication Data
US 2022/0236859 A1 Jul. 28, 2022

(51) Int. Cl.
*G06F 3/04842* (2022.01)
*G09B 29/10* (2006.01)
*G06F 9/451* (2018.01)

(52) U.S. Cl.
CPC .......... *G06F 3/04842* (2013.01); *G06F 9/451* (2018.02); *G09B 29/106* (2013.01)

(58) Field of Classification Search
CPC ............. G06F 3/04842; G06F 3/04883; G06F 3/04845; G06F 3/165; G06F 3/04886; G06N 5/02; G09B 29/106; G09G 5/377; G09G 2320/046; G09G 2354/00; G09G 2330/022; G09G 3/20; G09G 5/14; G11B 27/34; G11B 27/102
See application file for complete search history.

(56) References Cited

U.S. PATENT DOCUMENTS

| | | |
|---|---|---|
| 2013/0231999 A1 | 9/2013 | Emrich et al. |
| 2016/0080438 A1 | 3/2016 | Liang |
| 2017/0091664 A1 | 3/2017 | Sanchez et al. |
| 2017/0132569 A1* | 5/2017 | Parhi ................. G06Q 10/1053 |
| 2017/0372182 A1 | 12/2017 | Whritenor et al. |
| 2018/0052929 A1* | 2/2018 | Liu ........................ G06F 16/951 |
| 2018/0322690 A1* | 11/2018 | Paulovich ............. G06T 15/005 |
| 2019/0080351 A1* | 3/2019 | Garg .................. G06Q 30/0253 |
| 2019/0087842 A1* | 3/2019 | Koenig ............... G06Q 30/0209 |
| 2020/0066194 A1* | 2/2020 | Osmanis ................. G06F 3/041 |
| 2020/0320592 A1* | 10/2020 | Soule ..................... G06Q 50/22 |
| 2021/0042008 A1* | 2/2021 | Chueh ..................... G06F 3/033 |
| 2021/0056458 A1* | 2/2021 | Savova .................... G06N 5/02 |

OTHER PUBLICATIONS

Victoria Rege, If You Build It, They Will Come: Multi-User VR Environment Showcased at GTC, Nvidia, May 8, 2017, 4 pages.

* cited by examiner

*Primary Examiner* — Angie Badawi
(74) *Attorney, Agent, or Firm* — Brandon Hicks; Eversheds Sutherland (US) LLP

(57) ABSTRACT

Systems and methods interacting with a digital map are provided herein. A system includes a display that is configured to display a digital map. The digital map includes a number of targets with which a user can interact and a number of actions that are available for each target. The system is configured to update a table of an individual profile account when the user performs an actions at one of the targets, use a role prediction model to predict a role based on the table of the individual profile account, and update the table of the individual account based on a table of a role profile account associated with the predicted role.

16 Claims, 3 Drawing Sheets

SYSTEMS AND METHODS FOR INTERACTING WITH A DIGITAL MAP

BACKGROUND

Displays and models of a transportation operating system (TOS) allow users to explore features of a digital map. However, interacting with the digital map may be difficult, for example, if the map presents feature that are not relevant to the user.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
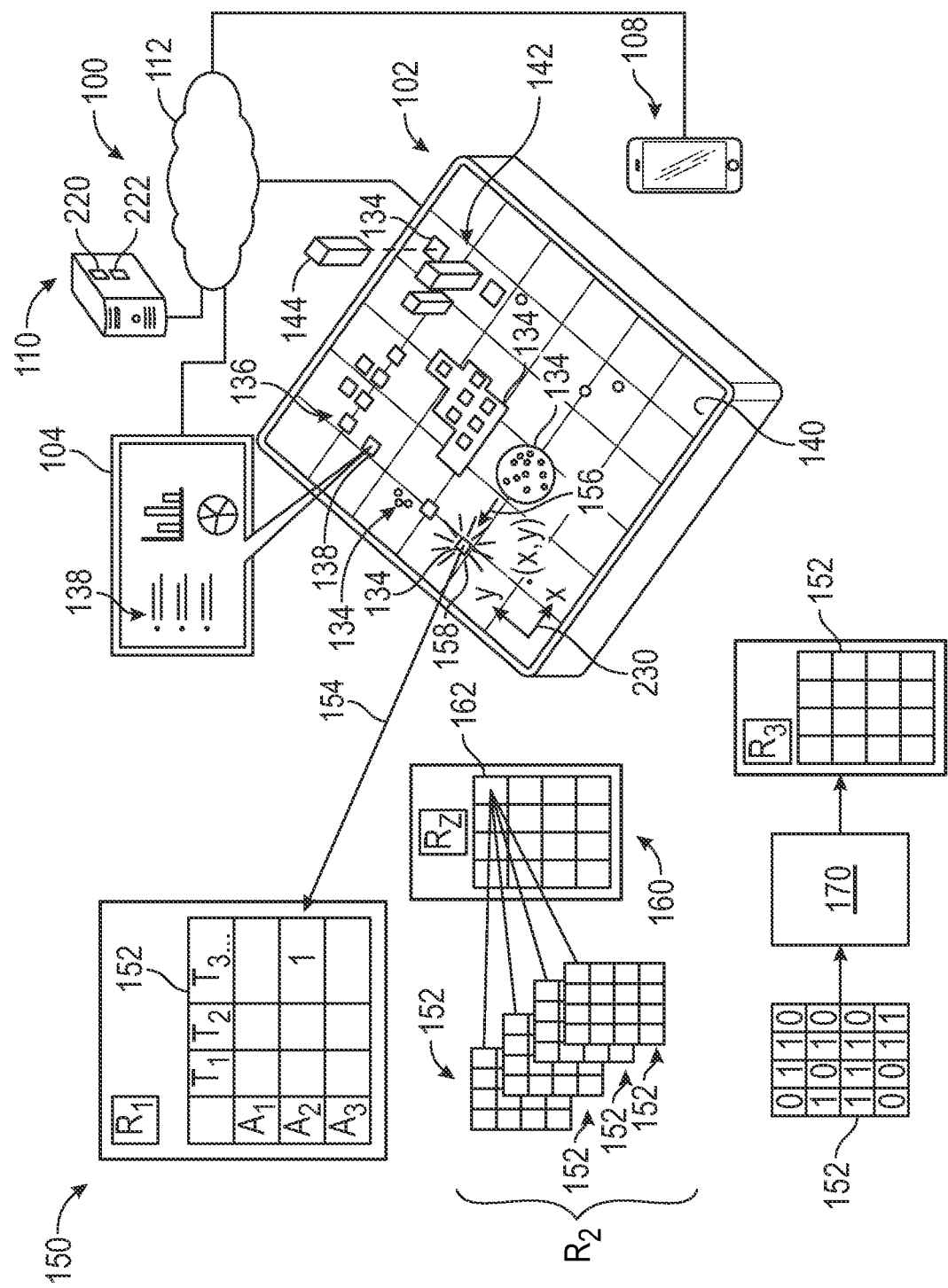
FIG. 1 depicts a display system including a tabletop model, an individual profile account, a role profile account, and a prediction model in accordance with the disclosure.

Referring to FIG. 1, a display system 100 includes a tabletop model 102 and one or more devices for interacting with the tabletop model 102 including a mobile device 108 and a auxiliary display 104. The display system may include one or more computer systems including a system computer 110. The tabletop model 102, auxiliary display 104, mobile device 108, and system computer 110 may communicate with one another over a network 112.

The tabletop model 102 includes a tabletop display 140 and a three-dimensional physical model 142. The system computer 110 displays a digital map 136 on the tabletop display 140 (e.g., a tabletop display) and/or on the auxiliary display 104. The three-dimensional physical model 142 overlays the digital map 136 on the tabletop display 140.

The digital map 136 includes digital objects 134 and the three-dimensional physical model 142 includes three-dimensional physical objects 144. In the case of objects such as buildings, three-dimensional physical objects 144 may align with digital objects 134.

A user may interact with the digital map 136 of the tabletop model 102 with the mobile device 108 (e.g., that controls a cursor on the tabletop display 140), through the touchscreen of the auxiliary display 104 that displays the digital map 136, through a touchscreen of the tabletop display 140, and/or in other ways.

An interaction may include an action to select a location (x, y) on the digital map; select a digital object 134 of the digital map 136; add/remove a digital object 134 to/from the digital map 136; search, select, add, remove, save and/or export object information 138 that is displayed for an object or location (e.g., displayed in response to selecting a digital object 134 or location); and the like. Selecting information may include following links to detailed descriptions or additional information.

A user may register an individual profile account 150 that is stored in a user database on the system computer 110. The actions by a user to interact with the digital map 136 are added to the individual profile account 150 of the user.

For example, the individual profile account 150 can include a table 152 of actions (An) and targets (Tm) of each action (e.g., targets may include a location (x, y), a digital object 134, object information 138 (a link), etc.). A count 154 can be added to the table 152 each time an action (An) is performed on (or near) a target (Tm) (e.g., selecting (A2) a footprint of a building (T3) with a cursor 156). The table 152 tracks the interactions between the user and the display system 100 and reflects the interest of the user with respect to the targets (Tm) of the digital map 136. The display system 100 can use the table 152 to highlight or selectively display targets (Tm) (e.g., areas, objects, and information of interest) and to recommend actions (An) for a target (Tm) based the what the user has been interested in the past.

The individual profile account 150 may indicate or include a role (Rp) or persona of the user. Exemplary roles (Rp) include engineer, consultant, enforcement officer, city partner, mayor, citizen, student, urban planner, and the like.

The tables 152 of the individual profile accounts 150 that have the same role (Rp) can be consolidated into a role profile account 160. For example, the counts 154 of each action (An) at each target (Tm) can be summed across individual profile accounts 150 of a particular role (e.g., role R2) to create a table 162 of the role profile account 160 for the role (e.g., role R2). The summed counts 154 may be normalized by dividing by the number of individual profile accounts 150 indicating the role.

The table 162 of the role profile account 160 may be used as a template or "cold-start" table for a newly created individual profile account 150 that indicates the role (Rp). For example, if a new individual profile account 150 is created and a role (Rp) is indicated, the table 162 of the role profile account 160 may be used to pre-populate the table 152 of the individual profile account 150 so that the display system 100 can suggest, highlight, or emphasize targets (Tm) (e.g., areas, objects, information of interest) and recommend actions (An) from the start. The individual profile account 150 may then be customized as described above after the user interacts with the display system 100.

If a role (Rp) is not indicated in the individual profile account 150 but the user has interacted with the display system 100, the display system 100 includes a prediction model 170 that predicts a role (e.g., role R3) based on the table 152 of an individual profile account 150. The corresponding role profile account 160 can then be determined based on the role (Rp) and the table 162 thereof can be used to change (or as a temporary replacement for) the table 152 of the individual profile account 150. The display system 100 then suggests, highlights, or emphasizes targets (Tm) (e.g., highlights areas, objects, information of interest) and recommends actions (An) that are more tailored to the role (Rp) based the individual profile account 150.

Illustrative Embodiments

Referring to FIG. 1, the display system 100 includes the tabletop model 102 and one or more devices for interacting with the tabletop model 102 including the tabletop display 140, the auxiliary display 104, and the mobile device 108.

The display system 100 may also include one or more computer systems including the system computer 110.

Functions disclosed herein can be executed internally by the tabletop model 102, the auxiliary display 104, and the mobile device 108, and/or can be executed externally by the system computer 110. Generally, the functions of the display system 100 may be centralized or decentralized among the elements of the display system 100.

The tabletop model 102, auxiliary display 104, the mobile device 108, and the system computer 110 may communicate with one another over the network 112. The network 112 may include any one or a combination of multiple different types of networks, such as cable networks, the Internet, wireless networks, and other private and/or public networks. In some instances, the network 112 may include cellular, Wi-Fi, or Wi-Fi direct.

The system computer 110 includes a memory 220 and a processor 222. The memory 220 stores instructions that are executed by the processor 222 to perform aspects of methods disclosed herein. When referring to operations executed by the system computer 110, it will be understood that this may include the execution of instructions by the processor 222.

Each of the tabletop model 102, auxiliary display 104, and the mobile device 108 may similarly include a memory and processor for executing instructions of the methods described herein. For purposes of illustration, the methods may be described as being executed by the system computer 110.

The memory 220 includes geospatial data including object data. Object data includes data associated with an object such as an object location, object information 138, and a digital object 134 of the digital map 136.

The object location may be coordinates (x, y) on a coordinate system 230 of the tabletop display 140. The object information 138 (e.g., characteristics of the object) may include descriptions, statistics, graphics, and other information associated with the object.

The digital object 134 may be a footprint, graphical representation of the object, or digital polygon-shaped cross-sectional area. The digital object 134 may define an area of connected streets, the footprint of a building, or an event object.

Objects may include roads, parking lots, buildings, districts, neighborhoods, bodies of water, parks, vehicles, pedestrians, public transportation systems, and the like.

Digital objects 134 may further include graphical representations of time-based or event-based information such as traffic accidents, traffic congestion, criminal activity, environmental information (e.g., from a weather station), temporal information (e.g., the time period at which the event exists), and the like. Similarly, digital objects 134 may represent statistical information associated with an area or location such as census data.

Generally, a digital object 134 may be a graphical representation of an individual object or may represent a group or cluster of individual objects, information, or statistics. For example, digital objects 134 may be displayed at actual locations of traffic accidents or a single digital object 134 may be used to represent the number of traffic accidents in an area. For example, more traffic accidents could be represented by a larger digital object 134 or the digital object 134 could be an area and the number of accidents in the area could be represented by the color of the digital object 134. Here, selection of a single digital object 134 that represents the number of traffic accidents may cause the display system 100 to then display digital objects 134 at the actual locations of the traffic accidents and statistics about the accidents as group. Each individual digital object 134 could then be selected to get more details or information about a specific accident.

In general, object data includes a digital object 134, an object location, and a next layer of data to display upon selection of the digital object 134. The next layer of data to display may include one or more additional digital objects 134, object information 138, characteristics, descriptions, statistical information, graphical information, combinations thereof, and the like.

The system computer 110 is configured to compile and format the geospatial data to generate an image of the digital map 136 (e.g., a planner representation) of a geographical area. The digital object 134 of an object is positioned at an associated object location on the digital map 136. The system computer 110 displays the digital map 136 on the tabletop display 140 (e.g., a tabletop display) of the tabletop model 102, on the auxiliary display 104, and/or on the mobile device 108.

The tabletop model 102 includes the tabletop display 140 and the three-dimensional physical model 142.

The tabletop display 140 may be a light emitting diode (LED) tabletop made of one or more flat screen LED TVs or a purpose-built flat screen LED display panel designed to display urban street activities, such as traffic flow. For example, the tabletop display 140 provides the digital map 136 of city streets or a geographical area. The three-dimensional physical model 142 overlays the digital map 136 on the tabletop display 140.

The tabletop display 140 can be controlled to alter any of a hue, intensity, color, brightness, and/or another similar attribute of the digital object 134. For example, after selection of an object, the system computer 110 may change a color or intensity of light of the associated digital object 134 to highlight the selected object.

The three-dimensional physical model 142 overlays the digital map 136 on the tabletop display 140. The three-dimensional physical model 142 includes three-dimensional physical objects 144.

The three-dimensional physical objects 144 align with the digital objects 134 of the tabletop display 140. The scale of the digital map 136 and the scale of the three-dimensional physical model 142 are selected, and the three-dimensional physical model 142 is positioned on the digital map 136, such that a three-dimensional physical object 144 has the object location of a corresponding digital object 134 (e.g., vertically aligned with one another as shown in FIG. 1). The three-dimensional physical object 144 overlays the corresponding digital object 134.

The three-dimensional physical model 142 may be printed or manufactured with a translucent material such as a polymer or glass. When a digital object 134 is highlighted, light from the digital object 134 is transmitted through the aligned three-dimensional physical object 144 to illuminate and highlight the three-dimensional physical object 144.

The mobile device 108 is configured to control the movement and position of the cursor 156 on the digital map 136. The cursor 156 can be moved to a position over (e.g., in the cross-sectional area of) a digital object 134.

The display system 100 may provide visual and haptic feedback to a user when the cursor 156 is over a digital object 134 to indicate that the object (e.g., such as a building or street) can be selected. For example, the digital object 134 may be highlighted with a first color (or other visual feedback) and the mobile device 108 may vibrate with a first vibration pattern (or other haptic feedback).

The mobile device 108 includes inputs to select an object. For example, a display of the mobile device 108 may be tapped or the mobile device 108 may display one or more buttons that can be pressed to select an object and/or then to unselect an object. The mobile device 108 may provide feedback to the user when an object is selected. For example, the digital object may be highlighted with a second color (e.g., visual feedback) and the mobile device 108 may vibrate with a second vibration pattern (e.g., haptic feedback).

Upon receiving a selection of an object from the mobile device 108, the display system 100 may also highlight a selected object on the auxiliary display 104. In addition, the display system 100 may access and display object information 138 on the auxiliary display 104.

Generally, a user may interact with the digital map 136 of the tabletop model 102 with the mobile device 108 (e.g., that controls the cursor 156 on the tabletop display 140), through the touchscreen of the auxiliary display 104 that displays the digital map 136, through a touchscreen of the tabletop display 140, and/or with other devices or methods.

An interaction may include an action to select a location (x, y) on the digital map 136; select a digital object 134 of the digital map 136; add/remove a digital object 134 to/from the digital map 136; search, select, add, remove, save and/or export object information 138 that is displayed for an object or location (e.g., displayed in response to selecting a digital object 134 or location); and the like. Selecting object information 138 may include following links to detailed descriptions or additional information.

A user may register an individual profile account 150 that is stored in a user database, for example, on the system computer 110. The actions by a user to interact with the digital map 136 are added to the individual profile account 150 of the user.

The user may login to the individual profile account 150 with a username and password to initiate a session via the display system 100. During a session, the user may interact with the tabletop model 102 and the display system 100 builds the user's individual profile account 150.

For example, the individual profile account 150 can include a table 152 of "n" possible actions (An) and "m" possible targets (Tm) (e.g., targets may include a location (x, y), digital object 134, object information 138 (a link), etc.). A count 154 can be added to the table 152 each time an action (An) is performed on a target (Tm) (e.g., selecting (A2) a footprint of a building (T3) with the cursor 156 adds a count 154 to the table 152 as shown in FIG. 1).

The table 152 tracks the interactions between the user and the display system 100 and reflects the interest of the user with respect to the targets (Tm) of the digital map 136. The display system 100 can use the table 152 to highlight or selectively display targets (Tm) and to recommend actions (An) for a target (Tm) based the what the user has been interested in in the past.

A count 154 may also be weighted by an amount of time for which the digital object 134 was selected before deselecting or selecting another object, whether the digital object 134 has been previously selected, the proximity to a digital object 134 that has been selected, based on the type of action performed, combinations thereof, and the like. For example, a digital object 134 that is selected may have a count 154 with a weight of five and a digital object 134 that is within a threshold distance may have a count 154 with a weight of one. Accordingly, the primary area of focus is assigned a higher level of interest and the general area around the primary area of focus is assigned a lower level of interest.

Some users may use the display system 100 to gather information in narrow categories of data. Other users may look to gather information across categories of data. Some users may add objects (e.g., a parking lot or a road) to the map to observe changes in modeled behavior of other objects or data. Some users may select or export data to generate a report.

The actions of a user using the display system 100 may correlate to a persona or role of the user. For example, a mayor role may review high-level performance indicators around the city and the status of city projects. A college student role may review the transit availability around home and work and search to find nearby businesses and reviews of the businesses. Elderly roles may search for access to health services. Urban planner roles may review multiple categories of data such as transit, socio-economic, origin/destination, and population and generate reports as part of a city plan.

The individual profile account 150 may indicate or include a role (Rp) or persona of the user. The role may be one of "p" possible roles (Rp). Exemplary roles (Rp) include engineer, consultant, enforcement officer, city partner, mayor, citizen, student, urban planner, and the like.

Figure 2:
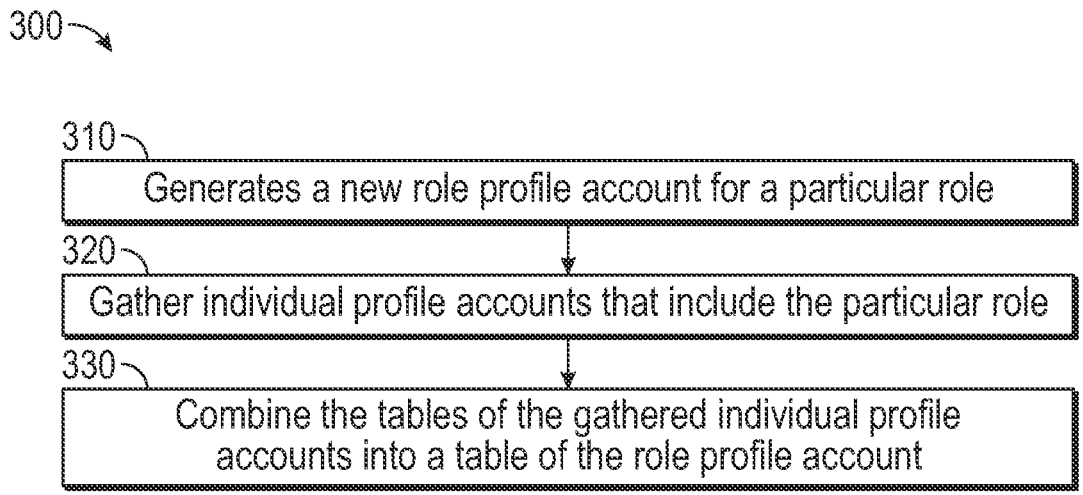
FIG. 2 depicts a method of creating a role profile account in accordance with the present disclosure.
Figure 3:
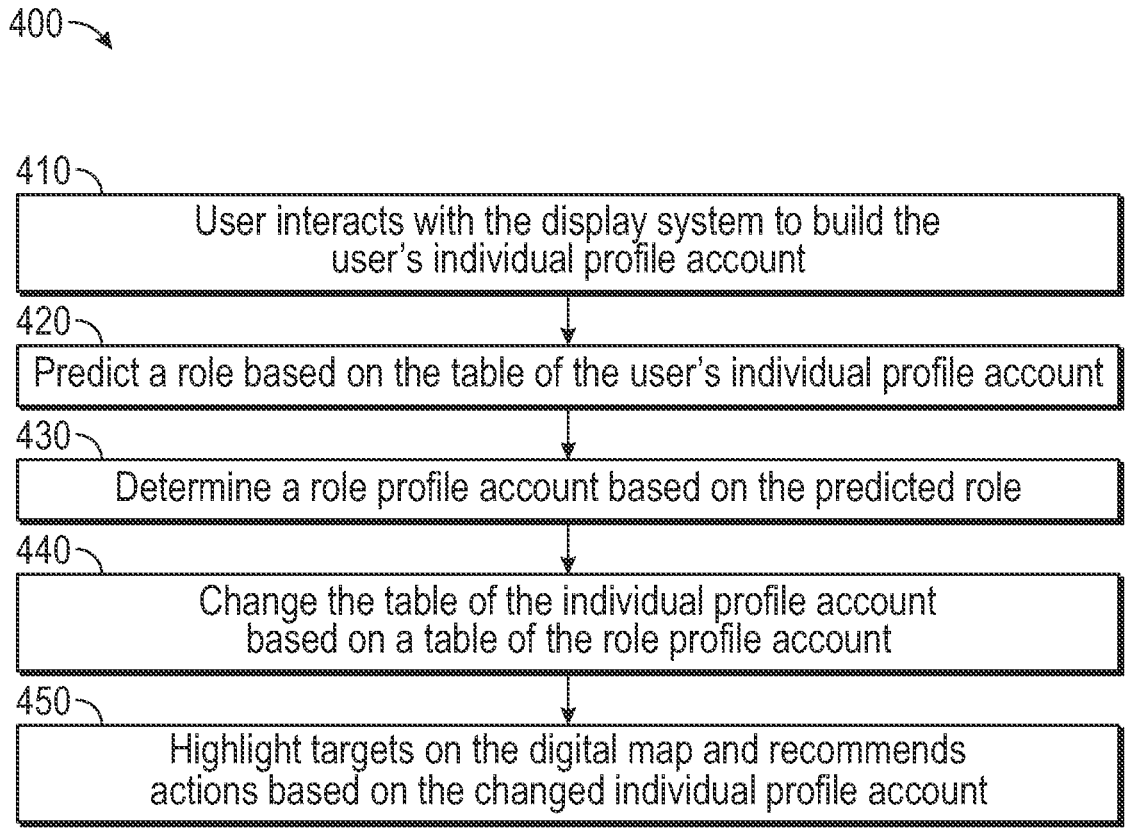
FIG. 3 depicts a method of predicting a role based on an individual profile account in accordance with the present disclosure.
Figure 4:
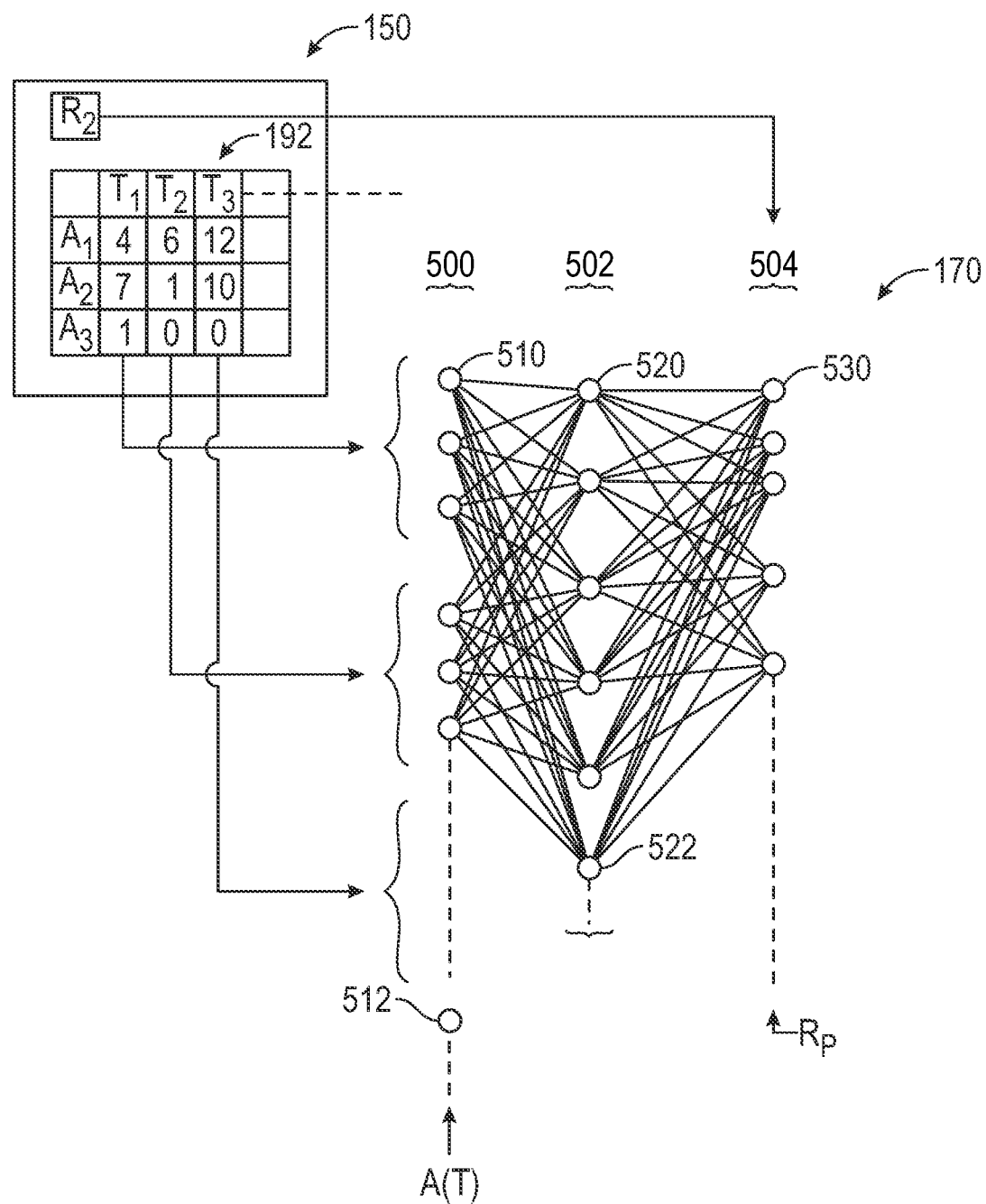
FIG. 4 depicts a prediction model in accordance with the present disclosure.

The tables 152 of the individual profile accounts 150 that have the same role (Rp) can be consolidated into a role profile account 160. For example, referring to FIG. 2, according to a first step 310 of an exemplary method 300, the display system 100 generates a new role profile account 160 for a particular role (e.g., role R2). According to a second step 320, the display system 100 gathers the individual profile accounts 150 that include the particular role.

According to a third step 330, the display system 100 combines the tables 152 of the gathered individual profile accounts 150. For example, the counts of each action (An) at each target (Tm) are summed or combined across the gathered individual profile accounts 150 to create a table 162 of the role profile account 160 for the particular role. The summed counts may be normalized by dividing by the number of individual profile accounts 150 that include the particular role.

The table 162 of the role profile account 160 may be used as a "cold-start" table 152 for a newly created individual profile account 150 that indicates the role (Rp). If a new individual profile account 150 is created and a role (Rp) is indicated, the table 162 of the role profile account 160 for that role (Rp) may be used to pre-populate the table 152 of the individual profile account 150. Accordingly, the display system 100 can suggest, highlight, or emphasize targets (Tm) and recommend actions (An) from the start for a new user.

Alternatively, table 162 for a role profile account 160 may be manually determined, determined from selection of categories (e.g., targets may be categorized), and the like.

If a role (Rp) is not indicated in the individual profile account 150, according to a first step 410 of an exemplary method 400, the user interacts with the display system 100 to build the user's individual profile account 150. According to a second step 420, the display system 100 uses a prediction model 170 to predict a role (e.g., role R3) based on the table 152 of an individual profile account 150. According to a third step 430, the display system 100 determines a role profile account 160 based on the predicted role (Rp). According to a fourth step 440, the table 162 of the determined role profile account 160 is used to change the table 152 of the individual profile account 150. According to a fifth step 450, the display system 100 suggests, highlights, or emphasizes targets (Tm) and recommends actions (An) that are more tailored to the role (Rp) based the individual profile account 150.

The prediction model 170 may include an input layer 500, one or more hidden layers 502, and an output layer 504. The values for the input layer 500 are the counts 154 (the actions (An) at each target (Tm)) in a table 152 of an individual profile account 150. The output layer 504 is the roles (Rp).

In particular, the nodes 510 of the input layer 500 are the rows (actions) of each column (targets) of the table 152 and a bias node 512. The hidden layers 502 may have various numbers of "activation" nodes 520 and a bias node 522. The nodes 530 of the output layer are the "p" number of different roles (Rp) (e.g., the model 170 predicts probability values for the roles).

Each node is connected to each node in the next layer and each connection has a weight such that each node in the hidden layer 502 is a weighted sum of each of the nodes in the previous layer (e.g., the first layer 500 or a hidden layer if additional hidden layers 502 are used). Each node has an activation function (e.g., a unit step) that determines a value (e.g., from zero to one) based on the weighed sum.

The input values of the first layer 500 are the counts 154 as described above. The value at each node in each layer after the first layer is calculated by what may be referred to as a hypothesis function. The hypothesis function is the activation function applied to a weighted sum of the values of the previous layer of nodes (e.g., input values). The weighted sum is the values of the previous layer multiplied by weights between the nodes of the previous layer and the nodes of the current layer.

The activation function may be a sigmoid function with a range of values between zero and one. Because multiple roles (Rp) are used, the sigmoid function allows for different probabilities or levels of activation of a node and the model chooses the role (Rp) with the highest probability of fitting the values in a table 152 of an individual profile account 150. The bias node allows the activation function to shift or to change steepness.

A cost function represents the sum of the error (e.g., difference between the predicted value and the real value). The prediction model 170 determines values for the weights that minimize the error of the cost function. For training and testing, the tables 152 of individual profile accounts 150 with a role indicated (i.e., known output values) are used. If the table 152 is for a second role (e.g., role R2), the output values for the output layer 504 will be a value of one for the second role (R2) and zero for the other roles (Rp). The weights can be calculated with backpropagation methods using the tables 152 and associated roles (Rp) of an individual profile account 150 as training examples and for testing for accuracy.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A display system, comprising:
a tabletop display configured to display a digital map of a geographical location comprising a number of targets with which a user can interact and a number of actions that are available for each target, and a three-dimensional physical model that is configured to overlay the digital map on the tabletop display, wherein the three-dimensional physical model comprises a translucent material;
a mobile device that is separate from the tabletop display and is configured to perform an action in association with a target on the digital map displayed on the tabletop display, wherein the mobile device includes an input to select a digital object of the digital map when a cursor is over the digital object;
a processor;
a memory, comprising:
an individual profile account including a table of targets on the digital map that have been selected by the user and actions taken by the user with respect to the targets;
a role prediction model;
a role profile account; and
computer executable instructions that, when executed by the processor, cause the processor to:
selectively highlight a first set of three-dimensional objects in the three-dimensional physical model associated with the geographical location based on the table associated with the individual profile account;
update the table of the individual profile account when the user performs one of the actions at one of the targets;
update the table to increment a counter based on the user performing one of the actions at one of the targets;
use the role prediction model to determine a predicted role of the user within the geographical location based on the table of the individual profile account;
update the table of the individual profile account based on a table of the role profile account of the predicted role; and
selectively highlight a second set of three-dimensional objects in the three-dimensional physical model associated with the geographical location based on the predicted role and the counter.

2. The display system of claim 1, wherein the target is at least one of a location, a digital object, and a link.

3. The display system of claim 1, comprising computer executable instructions that, when executed by the processor, cause the processor to: recommend actions for the targets based on the table of the individual profile account.

4. The display system of claim 1, wherein the memory includes a plurality of individual profile accounts and tables of a subset of the plurality of individual profile accounts that have the same role are combined to create the table of the role profile account.

5. The display system of claim 1, wherein the table of the individual profile account provides values to an input layer of the role prediction model.

6. The display system of claim 1, wherein an output of the role prediction model is a probability, for each of a number of roles, that values of the table of the individual profile account fit a role.

7. The system of claim 1, wherein the predicted role includes at least one of: an engineer, a consultant, a government official, a citizen, and an urban planner.

8. A method, comprising:
selectively highlighting, on a digital map of a geographical location associated with a tabletop display, a first set of three-dimensional objects associated with a geographical region, wherein the first set of targets include targets that a user can interact with, wherein the first set of targets is selected based on a table associated with an individual profile account of the user, wherein the individual profile account includes a table of targets on the digital map that have been selected by the user and actions taken by the user with respect to the targets, wherein the tabletop display further comprises a three-dimensional physical model that is configured to overlay the digital map on the tabletop display, wherein the three-dimensional physical model comprises a translucent material, wherein the three-dimensional objects are included within the three-dimensional physical model;
updating the table of the individual profile account when the user performs one of a number of actions at one of a number of the first set of targets on the digital map;
updating the table to increment a counter based on the user performing one of the actions at one of the targets;
predicting, with a role prediction model, a role of the user within the geographical location based on the table of the individual profile account;
updating the table of the individual profile account based on a table of a role profile account that is associated with the predicted role; and
selectively highlighting, on the digital map, a second set of three-dimensional objects in the three-dimensional physical model associated with the geographical region based on the predicted role and the counter.

9. The method of claim 8, wherein a number of targets includes at least one of a location, a digital object, and a link.

10. The method of claim 8, comprising adding a count to the table of the individual profile account when the user performs one of the number of actions at one of the number of targets on the digital map, wherein the table is updated based on the count, and wherein the second set of targets is displayed based on the count.

11. The method of claim 8, comprising at least one of displaying and highlighting targets on the digital map based on the table of the individual profile account.

12. The method of claim 11, comprising recommending actions for the targets based on the table of the individual profile account.

13. The method of claim 8, wherein tables of a subset of a plurality of individual profile accounts that have the same role are combined to create the table of the role profile account.

14. The method of claim 8, wherein the table of the individual profile account provides values to an input layer of the role prediction model.

15. The method of claim 8, wherein an output of the role prediction model is a probability, for each of a number of roles, that values of the table of the individual profile account fit a role.

16. A non-transitory computer-readable medium storing computer-executable instructions which, when executed by a processor, cause the processor to perform operations comprising:
selectively highlighting, on a digital map of a geographical location associated with a tabletop display, a first set of three-dimensional objects associated with a geographical region, wherein the first set of targets include targets that a user can interact with, wherein the first set of targets is selected based on a table associated with an individual profile account of the user, wherein the individual profile account includes a table of targets on the digital map that have been selected by the user and actions taken by the user with respect to the targets, wherein the tabletop display further comprises a three-dimensional physical model that is configured to overlay the digital map on the tabletop display, wherein the three-dimensional physical model comprises a translucent material, wherein the three-dimensional objects are included within the three-dimensional physical model;
updating the table of the individual profile account when the user performs one of a number of actions at one of a number of the first set of targets on the digital map;
updating the table to increment a counter based on the user performing one of the actions at one of the targets;
predicting, with a role prediction model, a role of the user within the geographical location based on the table of the individual profile account;
updating the table of the individual profile account based on a table of a role profile account that is associated with the predicted role; and
selectively highlighting, on the digital map, a second set of three-dimensional objects in the three-dimensional physical model associated with the geographical region based on the predicted role and the counter.

* * * * *